Feb. 4, 1969    H. MAYR ETAL    3,425,776
MOVIE CAMERA WITH FADING MEANS
Filed Nov. 30, 1965
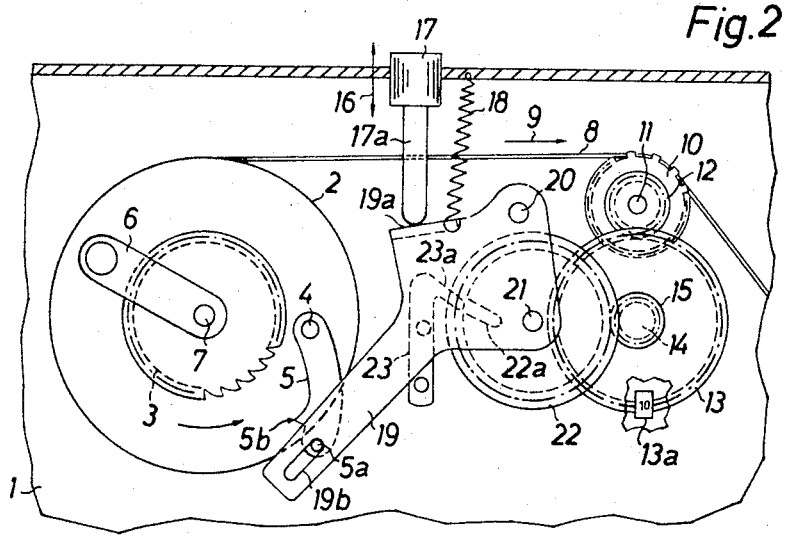
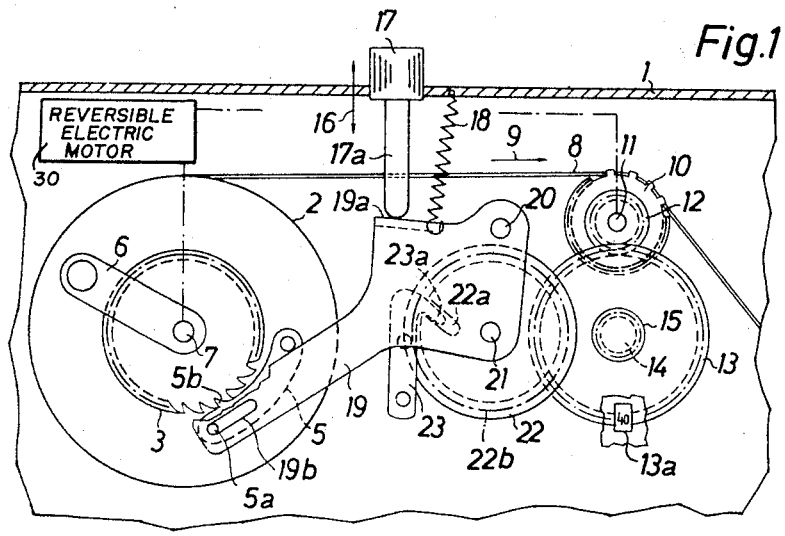
INVENTORS:
HELMUT MAYR
RICHARD PELTE
AUGUST AURACHER
Michael S. Striker
Attorney

United States Patent Office 3,425,776
Patented Feb. 4, 1969

3,425,776
MOVIE CAMERA WITH FADING MEANS
Helmut Mayr and Richard Pelte, Munich, and August Auracher, Unterhaching, near Munich, Germany, assignors to Agfa-Gevaert Aktiengesellschaft, Leverkusen, Germany
Filed Nov. 30, 1965, Ser. No. 510,630
Claims priority, application Germany, Dec. 3, 1964,
A 47,766
U.S. Cl. 352—175    12 Claims
Int. Cl. G03b 1/62

ABSTRACT OF THE DISCLOSURE

A motion picture camera with fading means wherein a button is depressed to start the fading operation and to couple a measuring wheel to the film transporting mechanism. The wheel rotates during withdrawal and during rewinding of film onto the supply reel during fading and initiates automatic stoppage of the supply reel when the length of film which is rewound equals the length of film which was previously withdrawn during fading.

---

The present invention relates to movie cameras in general, and more particularly to movie cameras with fading means. Still more particularly, the invention relates to a novel device which measures the length of that portion of photographic film in a movie camera which is transported forwardly or backwards during fade-in or fade-out.

Movie cameras with fading means are known in the art. During fading, a portion of photographic film must be transported forwardly or backwards, and the length of such film portion must be determined by observing the readings furnished by the footage indicator. Conventional footage indicators are not designed to furnish highly accurate readings so that it is practically impossible to determine the exact length of that film portion which is being transported during fading.

Accordingly, it is an important object of the present invention to provide a movie camera with a novel measuring device which can furnish highly accurate readings as regards the length of that film portion which is being transported in the course of a fading operation.

Another object of the invention is to provide a movie camera which embodies the novel measuring device and to construct and assemble the camera in such a way that the film portion which is transported during fading is measured and memorized in a fully automatic way, in response to operation of the fading means, and without necessitating observation of the frame indicator.

A further object of the invention is to provide a novel operative connection between the measuring device and the fading means of a movie camera.

An additional object of the invention is to provide a novel operative connection between the measuring device and the footage indicator of a movie camera.

Still another object of our invention is to provide a movie camera which embodies the novel measuring device and wherein the measuring device determines the length of that film portion which can be rewound onto the supply reel in the course of a fading operation.

A concomitant object of the invention is to provide a movie camera wherein the length of that film portion which is withdrawn from the supply reel in a first phase of fading operation invariably equals the length of that film portion which is rewound onto the supply reel in the next phase of the fading operation.

A further object of the invention is to provide a movie camera wherein the backwind is automatically blocked when a film portion of accurately determined length is rewound onto the supply spool.

Another object of the invention is to provide a novel film transporting unit for use in a movie camera of the above outlined characteristics.

Briefly stated, one feature of our present invention resides in the provision of a movie camera with fading means. The camera comprises a rotary reel or an analogous source of convoluted photographic film, a transporting unit including means for withdrawing the film from the source and backwind means for returning the film to the source, an actuating member which is operative to set the camera for fading during which a film portion of predetermined length is being withdrawn from or returned to the source, and measuring means for determining and memorizing the exact length of such portion of the film. The camera may further comprise a footage indicator and a drive connecting the footage indicator with the transporting unit so that the transporting unit operates the footage indicator regardless of whether the film is being withdrawn from or returned to the source. The measuring means may comprise a rotary measuring wheel which may be moved by a lever into motion receiving engagement with the drive for the footage indicator in response to operation of the actuating member, and the camera then further comprises a blocking device which can arrest the measuring wheel in a starting position. A suitable arresting or locking device can couple the aforementioned lever with the reel to prevent operation of the backwind when the backwind has completed rewinding of a predetermined length of film onto the reel, and the lever may be rocked by the actuating member against the bias of a spring to move from an idle position and to thereby disengage the blocking device and the arresting device by simultaneously moving the measuring wheel into motion receiving engagement with the drive for the footage indicator. In such position of the lever, the measuring wheel will be compelled to rotate in response to operation of the transporting unit.

In accordance with a more specific feature of our invention, the aforementioned blocking device may be constituted by a fixed blocking portion which is attached to the housing of the movie camera and by a recess provided in the periphery of the measuring wheel and receiving the fixed blocking portion when the actuating member is released and when the spring is free to move the lever to idle position while the measuring wheel assumes its starting position. The spring biases the measuring wheel against the fixed blocking portion so that the latter automatically enters the recess when the backwind has been operated by the operator to effect movement of a predetermined length of film back to the source. Such automatic blocking of the measuring wheel in starting position is due to the fact that the fixed blocking portion then registers with the recess in the periphery of the measuring wheel.

The novel features which are considered as characteristic of the invention are set forth in particular in the appended claims. The improved movie camera, itself however, both as to its construction and its mode of operation, together with additional features and advantages whereof will be best understood upon perusal of the following detailed description of a specific embodiment with reference to the accompanying drawings, in which;

FIG. 1 is a fragmentary section through a movie camera which embodies the novel measuring device and wherein the measuring wheel is shown in starting position; and FIG. 2 is a similar sectional view but showing the measuring wheel in another position.

Referring to the drawings in detail, there is shown a portion of a movie camera which comprises a housing 1. This housing accommodates a source of photographic film 8 here shown as constituted by a rotary film supply spool or reel 2. The reel 2 carries one element 3 of a releasable locking or arresting device which can prevent rewinding of film 8 onto the reel 2 in certain stages of operation as will be fully described hereinafter. The element 3 is a ratchet wheel which is connected with the reel 2 and can cooperate with a second locking or arresting element in the form of a pawl 5 mounted on a pivot 4 which is fixed to the housing 1. The backwind of the transporting unit for the film 8 includes a lever 6 which is mounted on a shaft 7 and can be rotated in a counter-clockwise direction only when the pallet 5b of the pawl 5 is disengaged from the ratchet wheel 3, see FIG. 2. That part of the transporting unit which withdraws film from the reel 2 includes a sprocket 10 which is mounted on and is driven by a shaft 11. The shaft 11 may be driven by a spring motor or by an electric motor and then causes the sprocket 10 to advance the film 8 in the direction indicated by an arrow 9. The teeth of the sprocket 10 enter the perforations of the film, and this sprocket is coaxially secured to a drive pinion 12 which rotates a footage indicator here shown as a toothed counter wheel 13. The wheel 13 is mounted on a shaft 14 and is coaxially secured to a drive pinion 15. The graduations of the counter wheel 13 can be observed through a window 13a which is provided in a side wall of the housing 1.

The housing 1 is further provided with an opening which accommodates an actuating member 17 which can operate the fading means. This actuating member is shown in the form of a pushbutton which is reciprocable in directions indicated by a double-headed arrow 16. The stem 17a of the pushbutton 17 abuts against a small lateral projection or ledge 19a provided on a motion transmitting lever 19 which is rockable about a pivot pin 20 and is biased by a helical return spring 18 tending to maintain the pushbutton and the lever in the idle positions shown in FIG. 1.

The lever 19 carries a shaft 21 for a rotary measuring wheel 22 having a toothed portion 22b which can be shifted into and out of mesh with the drive pinion 15 on the shaft 14 of the counter wheel 13. The housing 1 and the measuring wheel 22 carry the elements of a blocking device which can maintain the wheel 22 in a starting position shown in FIG. 1. The blocking device includes a fixed blocking member 23 having a hooked end portion or tang 23a, and a recess 22a provided in the periphery of the measuring wheel 22. The tang 23a enters the recess 22a when the wheel 22 assumes the starting position of FIG. 1 and when the lever 19 can follow the bias of the spring 18.

The coupling between the lever 19 and the pawl 5 is constituted by a pin-and-slot connection 19b, 5a. The pawl 5 is compelled to move its pallet 5b into engagement with the ratchet wheel 3 when the spring 18 shifts the toothed portion 22b of the measuring wheel 22 away from the drive pinion 15.

In order to carry out a fading operation, the pushbutton 17 is depressed to assume the position shown in FIG. 2. The stem 17a then rocks the lever 19 in a counter-clockwise direction and the pinion 15 is drivingly coupled with the toothed portion 22b of the measuring wheel 22. At the same time, the recess 22a moves away from the tang 23a of the fixed blocking element 23 so that the wheel 22 is free to rotate in response to rotation of the sprocket 10. When it moves to the position of FIG. 2, the lever 19 rocks the pawl 5 to move the pallet 5b away from the ratchet wheel 3 so that the reel 2 can be rotated in either direction, i.e., by the backwind lever 6 or by the motor which drives the sprocket 10. The pushbutton 17 and/or the lever 19 causes the fading means to effect a fade-in or fade-out in a manner not forming part of the present invention. Reference may be had to the copending application Ser. No. 325,820 of Winkler, now Patent No. 3,246,944 which is assigned to the same assignee. Such fade-in or fade-out can be initiated directly by one of the parts 17, 19 or by a part which is coupled therewith. The fade-in or fade-out can be carried out by means of a separate motor as disclosed in the aforementioned Winkler patent.

Of course, the camera also comprises a release trigger which can start the motor for the sprocket 10. When the release trigger is or remains depressed after the pushbutton 17 is moved to the position of FIG. 2, the sprocket 10 advances the film 8 in the direction of the arrow 9 until the trigger is released by the operator's finger. The duration of depression of the trigger will determine the duration of fading. The measuring wheel 22 rotates in response to rotation of the sprocket 10 because it receives motion through the drive 12, 14, 15. The rotational speed of the wheel 22 is less than the speed of the counter wheel 13 because the gear train 15, 22a constitutes a step-down transmission. As a rule, the fading operation is terminated before the wheel 22 completes a full revolution.

The pushbutton 17 can be released as soon as the measuring wheel 22 leaves the starting position of FIG. 2 and the pushbutton then remains depressed because the spring 18 cannot contract. This will be readily understood since the tang 23a of the fixed blocking member 23 then engages the peripheral surface of the wheel 22 and allows the spring 18 to contact only when the recess 22a returns into registry with the tang 23a. In other words, the pushbutton 17 can indicate to the user that a fading operation took place. The operator then rotates the backwind lever 6 in order to rewind the film 8 onto the reel 2. The motion transmitting connection between the shaft 7 of the backwind lever 6 and the reel 2 may comprise a suitable clutch which is active only when the lever 6 is swung to an operative position. Thus, the lever 6 need not be in permanent motion transmitting or motion receiving engagement with the reel 2 so that it need not rotate when the reel is rotated by the sprocket 10. However, the sprocket 10 will rotate whenever the film 8 moves lengthwise, regardless of whether the film is transported by this sprocket 10 or by the backwind lever 6.

During rewinding of film 8 onto the reel 2, the sprocket 10 drives the wheels 13 and 22 so that the recess 22a ultimately returns into registry with the tang 23a whereby the spring 18 is free to contract and returns the parts 5, 17, 19 and 22 to the positions shown in FIG. 1. The pallet 5b then reengages the ratchet wheel 3 and prevents further rotation of the backwind lever 6. When the operator thereupon starts the motor which drives the shaft 11, the sprocket 10 can transport the film 8 in the direction of the arrow 9 because the pallet 5b will merely ride over the teeth of the ratchet wheel 3.

It will be noted that the length of that portion of the film which is withdrawn from the reel 2 subsequent to depression of the pushbutton 17 invariably equals the length of that portion which is rewound onto the reel 2 in response to manual rotation of the lever 6. This is due to the fact that the wheel 22 is driven by the wheel 13 (i.e., by the sprocket 10). Consequently, the operator need not observe the position of the counter wheel 13 because the lever 19, with the parts mounted thereon or coupled therewith, invariably insures that the length of the withdrawn film portion equals with utmost accuracy the length of the rewound film portion. In other words, the operator need not memorize the reading furnished by the counter wheel 13 immediately prior to depression of the pushbuton and immediately following completed withdrawal of film from the reel 2.

On completion of the rewinding operation by the lever 6, and on actuation of the release trigger, the later causes the diaphragm to open when the film assumes the same position in which the diaphragm was closed during fading.

The improved movie camera may be modified in a number of ways without departing from the spirit of our invention. For example, the sprocket 10 may be driven by a spring motor or by a reversible electric motor. Also, the sprocket 10 may be replaced by a claw pull-down which can transport the film forwardly or backwards. If the pull-down is operated by a reversible electric motor, the motion transmitting lever 19 is preferably provided with a suitable trip which opens and closes the motor switch. The actuating member 17 or the lever 19 is then arranged in such a way that, when the fading means is set in operation, the film is first caused to advance in the direction of the arrow 9, that the motor is reversed when a predetermined length of film is withdrawn from the reel 2 so that the tang 23a can reenter the recess 22a, and that the motor is arrested when the tang reenters the recess. In addition, the motor or a motor-driven transmission must be coupled with the reel 2 as soon as the motor is set for operation in reverse. A suitable reversible electric motor is shown at 12 in FIG. 1 of the aforementioned Winkler patent. Such motor can be used as a substitute for the backwind lever 6 and for the means which rotates the shaft 11 of the sprocket 10 in a clockwise direction. Such a motor is shown at 30 in FIG. 1.

It is further possible to open and close the diaphragm by providing an electrical connection between the diaphragm and the actuating member 17 which controls the operation of the fading device.

Furthermore, the exact configuration of the parts shown in FIGS. 1 and 2 may be changed without affecting the basic operation of the movie camera. Thus, the measuring wheel 22 can be replaced by a toothed rack which is formed with a recess corresponding to the recess 22a, and the lever 19 can be replaced by a reciprocable slide which moves the rack into or out of mesh with the pinion 15 or with another rotary part which is driven in response to movement of film 8 in or counter to the direction indicated by the arrow 9.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a motion picture camera with fading means, a source of film; a transporting unit including means for withdrawing the film from and for returning the film to said source; an actuating member operative to set the camera for fading during which a predetermined portion of the film is drawn from or returned to said source; measuring means for determining the exact length of said predetermined portion of the film; and a footage counter including a moveable footage indicator and a drive connecting said indicator with said transporting unit, said measuring means comprising a measuring element movable into and from motion receiving engagement with said drive and blocking means including a fixed blocking portion and a second blocking portion provided on said measuring element and cooperating with said fixed blocking portion when said measuring element is disengaged from said drive to thereby fix the measuring element in a starting position.

2. In a motion picture camera with fading means, a source of film; a transporting unit including means for withdrawing the film from and for returning the film to said source; an actuating member operative to set the camera for fading during which a predetermined portion of film is drawn from or returned to said source; measuring means for determining the exact length of said predetermined portion of the film, said transporting unit comprising a drive for said measuring means and said measuring means comprising a measuring element movable into and out of motion receiving engagement with said drive; and blocking means including a fixed blocking portion and a second blocking portion provided on said measuring element and cooperating with said fixed blocking portion when said measuring element is disengaged from said drive to thereby fix the measuring element in a predetermined starting position.

3. A structure as set forth in claim 2, further comprising a motion transmitting member arranged to disengage said movable blocking portion from said fixed blocking portion and to simultaneously move said measuring element into motion receiving engagement with said drive in response to operation of said actuating member.

4. A structure as set forth in claim 3, wherein said measuring element is a rotary wheel and said movable blocking portion is constituted by a recess provided in the periphery of said wheel, said drive comprising a rotary member which is drivingly coupled with said wheel in response to operation of said actuating member so that, when said transporting unit withdraws the film from said source subsequent to operation of said actuating member, said wheel rotates in response to rotation of said rotary member to move said recess away from said fixed blocking portion by a distance corresponding to the length of that portion of the film which is withdrawn from said source subsequent to operation of said actuating member.

5. A structure as set forth in claim 4, further comprising means for permanently biasing the periphery of said wheel against said fixed blocking portion so that, on operation of said transporting unit to return the film onto said source, said fixed blocking portion automatically enters said recess when said predetermined length of film is returned to said source.

6. A structure as set forth in claim 3, wherein said motion transmitting member is a lever which is rockable by said actuating member from an idle position and said measuring element is a wheel rotatably mounted on said lever and being movable out of motion receiving engagement with said drive in response to movement of said lever to idle position, and further comprising means for permanently biasing said lever to such idle position.

7. A structure as set forth in claim 3, wherein said source includes a rotary reel and further comprising locking means operative to prevent operation of said transporting unit in a sense to return the film onto said reel when said measuring element is moved from motion receiving position.

8. A structure as set forth in claim 7, wherein said locking means comprises a ratchet wheel fixed to said reel and a pawl mounted on said motion transmitting member and cooperating with said ratchet wheel when said fixed blocking portion engages said movable blocking portion.

9. In a motion picture camera with fading means, a source of film; a transporting unit including transporting means for withdrawing the film from and for returning the film to said source and reversible electric motor means for said transporting means; an actuating member operative to set the camera for fading during which a predetermined portion of film is drawn from or returned to said source, said actuating member being arranged to start said motor means in a direction to withdraw the film from said source and to arrest said motor means when said predetermined portion of film is thereupon returned to said source; and measuring means for determining the exact length of said predetermined portion of the film.

10. In a motion picture camera, a source of film, said source comprising a reel arranged to accommodate a supply of convoluted film; a transporting unit including means for withdrawing the film from and for returning the film to said source and a manually operated backwind arranged to rotate said reel in a sense to rewind the film thereon; an actuating member operative to set the camera for fading during which a predetermined portion of film is drawn from or returned to said source; measuring means for determining the exact length of said predetermined portion of the film, including a measuring element movable into and out of motion receiving engagement with said transporting unit; a blocking device for normally maintaining said measuring element in a starting position when the measuring element is disengaged from said transporting unit, said actuating member being arranged to move said measuring element into engagement with said transporting unit and to simultaneously disengage said blocking device so that, while in engagement with said transporting unit, said measuring element is moved from said starting position to the extent determined by the length of that portion of the film which is withdrawn from said reel and returns to said starting position when the same length of film is rewound onto said reel; and locking means for opposing rewinding of the film onto said reel when said blocking device maintains the measuring element in said starting position.

11. A structure as set forth in claim 10, further comprising biasing means for permanently urging said measuring element out of engagement with said transporting unit so that said blocking device is effective when said measuring element returns to starting position and said actuating member does not interfere with the action of said biasing means.

12. In a motion picture camera with fading means, a source of film; a transporting unit including means for withdrawing the film from and for returning the film to said source; an actuating member operative to set the camera for fading during which said means of said transporting unit can withdraw a desired length of film from said source and during which said means of said transporting unit can return film to said source; means for automatically arresting said means of said transporting unit to terminate return movement of film when the length of the film which is returned to the source during fading equals said desired length; and actuating measuring means driven during any movement of the film a distance proportional to the distance said film is moved, said actuating measuring means actuating said arresting means after being driven a distance which is proportional to the length of film which is to be moved from and returned to said source while the camera is set for fading.

References Cited

UNITED STATES PATENTS

| 1,597,229 | 8/1926 | Ball | 352—91 |
| 3,152,332 | 10/1964 | Miyauchi | 352—172 |
| 3,246,944 | 4/1966 | Winkler | 352—91 |

FOREIGN PATENTS 1,124,808  3/1962  Germany.

NORTON ANSHER, *Primary Examiner.*

M. H. HAYES, *Assistant Examiner.*

U.S. Cl. X.R.

352—172, 176, 91